United States Patent [19]

Ofstead et al.

[11] 4,172,932
[45] Oct. 30, 1979

[54] PROCESS FOR THE PREPARATION OF POLYMERS OF CYCLOPENTENE OR COPOLYMERS OF CYCLOPENTENE WITH UNSATURATED ALICYCLIC COMPOUNDS

[75] Inventors: Eilert A. Ofstead, Cuyahoga Falls; Ken W. Donbar, Akron, both of Ohio

[73] Assignee: The Goodyear Tire & Rubber Company, Akron, Ohio

[21] Appl. No.: 831,200

[22] Filed: Sep. 7, 1977

[51] Int. Cl.² .......................... C08F 4/52; C08F 32/04
[52] U.S. Cl. ................................ 526/142; 252/429 B; 526/143; 526/308
[58] Field of Search ............................... 526/142, 143

[56] References Cited

U.S. PATENT DOCUMENTS

| | | | |
|---|---|---|---|
| 3,631,010 | 12/1971 | Witte et al. | 526/143 |
| 3,935,179 | 1/1976 | Ofstead | 526/142 |
| 4,038,471 | 7/1977 | Castner | 526/143 |

Primary Examiner—Edward J. Smith
Attorney, Agent, or Firm—J. Y. Clowney

[57] ABSTRACT

There is disclosed a process for the preparation of polymers of cyclopentene or copolymers of cyclopentene with non-conjugated unsaturated alicyclic compounds containing at least 7 carbon atoms in the ring and at least one double bond in the ring or polycyclic olefins or non-conjugated diolefins by the use of the catalyst system comprising (a) tungsten halides or oxyhalides, (b) an organoaluminum compound, (c) an alcohol, and (d) a halogenated phenol.

2 Claims, No Drawings

PROCESS FOR THE PREPARATION OF POLYMERS OF CYCLOPENTENE OR COPOLYMERS OF CYCLOPENTENE WITH UNSATURATED ALICYCLIC COMPOUNDS

This invention is directed to a process for the ring-opening polymerizaton of unsaturated alicyclic hydrocarbons. It is also directed to novel catalyst systems useful for this ring-opening polymerization process. These catalyst systems are further useful for the interconversion of acyclic olefins according to the method known as the olefin metathesis reaction (also called the olefin dismutation or olefin disproportionation reaction).

The olefin metathesis reaction is a unique bond reorganization process, whereby materials possessing carbon-to-carbon double bonds undergo a redistribution of constituents as depicted by the example in the following equation:

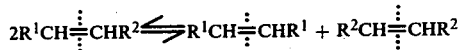

This novel reaction is known to proceed by the cleavage of the carbon-to-carbon double bond in the reacting olefin. The reaction can be visualized as a random recombination of these halves of olefins, or alkylidene moieties, to give all the possible combinations allowed from the starting material or mixture of materials chosen.

The olefin metathesis reaction, being an equilibrium process, facilitates: (1) obtaining the olefins $R^1CH=CHR^1$ and $R^2CH=CHR^2$ starting from $R^1CH=CHR^2$; or alternatively, (2) obtaining the olefin $R^1CH=CHR^2$ by starting from a mixture of olefins $R^1CH=CHR^1$ and $R^2CH=CHR^2$.

Similarly, the ring-opening polymerization reaction of cycloolefins also involves the scission of the carbon-to-carbon double bonds in the cycloolefin ring. The alkylidene carbons are rejoined to other such carbons derived from other monomer units to form the linear unsaturated polymer chain. Thus, the ring-opening of cyclopentene, for instance, yields a repeat unit:

In describing polymers which have been obtained from cyclopentene, this repeat unit has also been expressed in the following equivalent forms:

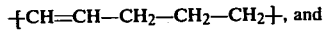

Processes for the metathesis polymerization of cycloolefins are known in the art. These procedures teach the use of a variety of transition metal compounds in combinations with various cocatalysts and catalyst modifiers for the ring-opening polymerization or copolymerization of cycloolefins. Exemplary of such processes is the use of oxygenated catalyst modifiers bearing oxygen-oxygen or oxygen-hydrogen bonds, in combinations with salts of tungsten or molybdenum and additionally an organometallic compound, as taught in U.S. Pat. No. 3,449,310. The process of this teaching has been shown to be effective for the polymerization of cyclopentene in the absence of solvents, but inferior results are obtained when diluents are employed. Relatively high catalyst levels are then required, preferably a transition metal/monomer ratio of 1/2000 or greater, and rates of polymerization are low.

It has been further taught in the art that, with appropriate choice of catalyst modifiers, good rates of polymerization can be obtained even in the presence of diluents, and solution polymerization techniques effective for industrial application may be employed. Exemplary of such processes is the use of various phenols containing 1-4 halogen atoms substituted on the aromatic ring as modifiers for tungsten salts in combination with organoaluminium compounds as catalysts for cyclopentene polymerizations, described in U.S. Pat. No. 3,631,010. This process is suitable for use in aromatic solvents, but markedly inferior results are frequently obtained when aliphatic solvents are employed; particularly if only one halogen atom is present on the phenolic ring. Furthermore, prior art dealing with the preparation of cyclopentene polymers and copolymers abounds with examples of the use of aromatic or halogenated solvents, but significantly, there is a paucity of examples wherein aliphatic or cycloaliphatic solvents have been used, because of technical difficulties encountered relating to low catalyst activity in the use of these solvents.

An object of this invention therefore is to provide methods whereby useful polymers and copolymers of cyclopentene can be prepared in aliphatic or cycloaliphatic solvents rather than aromatic solvents. Industrial processes in these cases would benefit because of the greater ease in handling of the less viscous polymer solutions which result, and the greater ease of polymer recovery made possible through the use of more volatile, lower-boiling aliphatic or cycloaliphatic solvents than are available in the case of aromatic solvents.

More specifically, the novelty of the present invention relates to the use of polyhalophenols (D) of the general formula:

where X and Y are chlorine or bromine, Q, L and M are selected from the group consisting of H, Cl, Br and R, wherein R is $C_nH_{2n+1}$ and n is 1 to 4, and wherein at least one of Q, L and M is H or R, as polymerization catalyst modifiers.

It has been discovered that, if the phenol does not contain halogens in both positions adjacent to the —OH substituents (i.e., positions 2 and 6), markedly inferior results are unexpectedly obtained when polymerizations are conducted in aliphatic solvents.

The required polyhalophenols of the present invention can be used to produce catalyst systems which exhibit excellent activity as cyclopentene ring-opening polymerization catalysts. These catalyst systems exhibit high rates of polymerization, they yield high trans-vinylene polymers of practical value, and they exhibit good tolerance for diene and olefin impurities in the monomer. Furthermore, very low catalyst concentrations may be used with excellent results. And of unique and practical significance, it has been discovered that these catalyst systems retain their advantages when aliphatic polymerization solvents are used. Thus, good yields of product can be obtained when the molar ratio of transition metal:monomer is as low as 1:10,000 or less even when aliphatic solvents are employed.

The process of this invention comprises the ring-opening polymerization or copolymerization of cyclopentene with at least one unsaturated alicyclic compound selected from the group consisting of (1) non-conjugated, unsaturated alicyclic compounds containing at least seven carbon atoms in the ring and at least one double bond in the ring, and (2) polycyclic olefins and polycyclic, non-conjugated diolefins, by subjecting said alicyclic compounds or their mixtures to polymerization conditions in the presence of a catalyst system comprising (A) a transition metal salt selected from the group consisting of tungsten halides and oxyhalides, (B) an organoaluminum compound, (C) at least one hydroxy compound of the general formula ROH wherein R is selected from the group consisting of alkyl, cyanoalkyl, cycloalkyl, aralkyl, alkoxyalkyl and aryl, and (D) a polyhalophenol of the general formula:

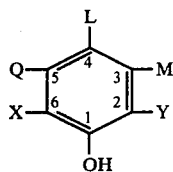
(D)

where X and Y are chlorine or bromine, Q, L and M are selected from the group consisting of H, Cl, Br and R, wherein R is $C_nH_{2n+1}$ and n is 1 to 4, and wherein at least one of Q, L and M is H or R and wherein the molar ratio of A:B:C:D lies within the range of 1:0.5–10:0.5–3:0.1–3.

The molar relationship of the various catalyst components may also be expressed as A/B ranging from 1/0.5 to 1/10, A/C ranging from 1/0.5 to 1/3.0 and A/D ranging from 1/0.1 to 1/3.0. Also, the transition metal is sometimes referred to as W, the organoaluminum compound as Al, the hydroxy compound as ROH, and the polyhalophenol as PHP.

The polymerization catalysts of this invention may be employed to prepare a wide variety of useful polymers having different properties depending upon the particular combination of monomers chosen to be polymerized, the particular catalyst combination employed and the particular polymerization conditions employed. The linear, unsaturated products resulting from the use of the polymerization catalysts of this invention can be employed in a variety of applications. For example, they may be employed to produce finished rubber articles such as pneumatic tires, molded goods and the like, or these materials may be useful in coatings, in adhesives, or in the manufacture of articles such as films and fibers.

Representative but not restrictive of the unsaturated alicyclic monomers described in (1) above are cycloheptene, cyclooctene, cyclodecene, cyclododecene, 1,5-cyclooctadiene, 1,9-cyclohexadecadiene, 1,5,9-cyclododecatriene, 3-methylcyclooctene, 3-phenylcyclooctene, 1-methyl-1,5-cyclooctadiene, 1-chloro-1,5-cyclooctadiene, 1,2-dimethyl-1,5-cyclooctadiene, and the like.

Representative of the transition metal salts of (A) are tungsten hexachloride, tungsten hexabromide, tungsten oxytetrachloride, tungsten oxytetrabromide, tungsten hexafluoride and the like. However, it is preferred to use tungsten hexachloride or tungsten oxytetrachloride.

Representative of the organoaluminum catalyst components in (B) above are trimethylaluminum, triethylaluminum, triisobutylaluminum, diethylaluminum chloride, diisobutylaluminum chloride, diethylaluminum fluoride, dipropylaluminum bromide, ethylaluminum sesquichloride, methylaluminum sesquibromide, butylaluminum sesquichloride, ethylaluminum dichloride, propylaluminum dichloride, isobutylaluminum dibromide and the like. Of these, it is usually preferred to employ organoaluminum chlorides or trialkylaluminum compounds.

Representative but not restrictive of the ROH compounds useful as the (C) catalyst component of the present invention are the simple aliphatic alcohols such as methyl, ethyl, propyl, isopropyl, n-butyl, sec-butyl and t-butyl alcohol, cyclopentanol, cyclohexanol, phenol, alkyl phenols such as o- m- and p-cresol and the like, and substituted alcohols such as benzyl alcohol, 2-cyanoethanol, 2-ethoxyethanol, 2-methoxyethanol, and the like.

Compounds useful as the (D) catalyst component of the present invention are 2,6-dichlorophenol, 2,6-dibromophenol, 2-bromo-6-chlorophenol, 2,6-dichloro-4-methylphenol, 2,6-dichloro-3,4,5-trimethylphenol, 2,6-dibromo-3-butylphenol, 2-bromo-4-ethyl-6-chlorophenol, 2,4,6-trichlorophenol, 2,4,6-tribromophenol, 2,3,4,6-tetrachlorophenol, 4-methyl-2,3,5,6-tetrachlorophenol, 2,3,6-tribromophenol, 2,3,6-trichlorophenol and the like. Of these, 2,6-dichlorophenol, 2,6-dibromophenol, 2,4,6-trichlorophenol and 2,4,6-tribromophenol are preferred.

The polyhalophenols of this invention may be used in combinations with the (A) and (B) compounds in the absence of the (C) catalyst component, and significant rates of polymerization can be obtained. However, it is preferred to employ the (C) components in combinations with the pentahalophenol.

The catalyst systems set forth above are prepared by mixing the components by known techniques. Thus, the catalyst systems may be prepared by "preformed" or "in situ" techniques, or by a combination of these techniques. By the preformed method, the catalyst components are mixed together prior to exposure to any of these components to the alicyclic monomers to be polymerized. In the "in situ" method, the catalyst components are added individually to the alicyclic monomers. In the handling and transfer of the catalyst components, it is often convenient to utilize solutions of these components in suitable inert solvents such as benzene, toluene, chlorobenzene, hexane, cyclohexane, pentane, cyclopentane and the like.

The order of addition of the catalyst components to each other is of interest in the practice of this invention.

When the in situ method is employed solely, it is much preferred to add the B component last, but the particular order of addition of the A, C and D components is generally not critical. Combinations of in situ and preformed methods can also be used effectively. In this case, it is generally preferred to employ the B component according to the in situ method, but component A may be preformed with component C or D or with both C and D. However, if either the C or the D component is to be used according to the in situ method, then it is preferred that the B component be the last one to be added to the monomer or mixture of monomer.

It has been found that when the preformed technique is employed with the catalyst components A, C and D, some aging of the mixture of the components is desirable. During this aging period, color changes are usually observed. This aging period may require only a few minutes, or it may take several hours. The aging process can be carried out at ambient temperature in the range of 20° C.-25° C., or it may be accelerated by the use of moderately elevated temperatures in the range of 30° C.-100° C.

It has also been found to be advantageous to remove some of the hydrogen chloride which is formed as a by-product when the preformed method is used. Known techniques may be used for removal of this hydrogen chloride. These techniques include the use of a stream of an inert gas which can be bubbled through the catalyst solution, or the use of a vacuum, to withdraw vapors of hydrogen chloride.

The amount of catalyst employed in the practice of this invention may range over a wide concentration range. Of course, a catalytic amount of the catalyst must be employed but the optimum amount depends upon a number of factors such as the temperature employed, the particular alicyclic monomers employed, the purity of the reaction conditions employed, the reaction time desired and the like. Generally, it is preferred to use at least about 1 mole of the A component per 20,000 moles of total monomer or mixture of monomers.

The operating conditions which are employed in the process of this invention may vary. The polymerization may be carried out in solution or in bulk. When solvents or diluents are employed, they should be chosen so as not to adversely affect the desired polymerization process. Representative examples of useful solvents are liquid aromatic hydrocarbons such as benzene, toluene and chlorobenzene, aliphatic saturated hydrocarbons such as pentane, hexane, heptane, petroleum ether and decane, and alicyclic saturated hydrocarbons such as cyclopentane, cyclohexane, decalin and the like.

The temperature at which the polymerization can be carried out can be varied over a wide range. It is generally preferred to conduct these polymerizations under relatively mild reaction conditions over the range of about −50° C. to about 100° C.

The polymerization times will vary and can range from less than a minute to 24 hours or more depending upon the polymerization conditions and the extent of polymerization desired. Generally, however, a satisfactory polymerization product is obtained in a matter of only a few minutes or hours.

The polymerization reaction may be carried out as a batch or as a continuous process. In performing the polymerization of this invention, the introduction of the monomer, catalyst and solvent—when a solvent is employed—can each be made to the reaction zone intermittently and/or continuously. When copolymerizations are to be carried out, it may be particularly advantageous to employ a continuous polymerization process.

The practice of this invention is further illustrated by reference to the following examples, which are intended to be representative rather than restrictive of the scope of this invention. All experiments were conducted in an atmosphere of dry nitrogen.

EXAMPLES 1-60

This series of experiments illustrates the uniqueness of phenols containing halogens in both positions adjacent to the phenolic OH-group as catalyst modifiers for cyclopentene polymerizations in an aliphatic solvent. All manipulations during premix (monomer plus solvent) drying and charging and catalyst addition were carried out under an atmosphere of dry nitrogen.

The "preformed" technique was used to prepare solutions of $WCl_6$ modified with the various phenols designated in Table I, in combinations with ethanol as a co-modifier. An equimolar amount of ethanol was first added to an 0.05 molar solution of $WCl_6$ in dry toluene, then the appropriate phenolic modifier was added and the mixture was allowed to react for about 2 hours at room temperature. The solution was then flushed with dry nitrogen to expel HCl. $C_2H_5AlCl_2$ (EADC) was employed as the cocatalyst, as a 0.20 molar solution in dry toluene.

Polymerizations were conducted using a premix solution containing 24% by weight of cyclopentene in hexane, which has been purified by being passed through a column containing a mixture of silica gel and alumina. Polymerizations were carried out using 40 ml of dried premix charged to 4-oz. glass, screw-capped bottles. Catalyst solutions were introduced by syringe. Polymerizations were carried out at 0° C., and were initiated by addition of the tungsten component, followed by the EADC. The molar ratio of cyclopentene/tungsten was about 6250/1 for these examples.

Polymerizations were terminated after 90 minutes with a small amount of methanol, and the resulting solutions were dried in entirety for yields. In experiments where no phenolic modifier was employed, yields were less than 1%. For all experiments in Table I, the products were rubbery polypentenamers resulting from ring-opening polymerization.

TABLE I

Percent Conversions of Cyclopentene to Polypentenamer with Different Phenolic Catalyst Modifiers

| Example Number | Phenol | Phenol/$W^a$ Al/$W^b$ | 1 | | 2 | | 3 | |
|---|---|---|---|---|---|---|---|---|
| | | | 2 | 3 | 3 | 4 | 3 | 4 |
| 1-6 | o-chlorophenol | | 3.9 | 3.8 | 0.7 | 7.5 | 0.0 | 3.7 |
| 7-12 | p chlorophenol | | 1.9 | 4.7 | 2.0 | 1.8 | 0.0 | 2.0 |
| 13-16 | 2,4-dichlorophenol | | 1.9 | 3.3 | 3.7 | 3.1 | 0.0 | 1.6 |
| 19-24 | 3,4-dichlorophenol | | 1.9 | 2.2 | 0.0 | 1.7 | 0.0 | 0.4 |
| 25-30 | 2,6-dichlorophenol | | 34.4 | 7.9 | 51.7 | 62.4 | 7.2 | 36.5 |
| 31-36 | 2,4,5-trichlorophenol | | 4.8 | 2.5 | 2.3 | 10.4 | 0.0 | 0.5 |
| 37-42 | 3,4,5-trichlorophenol | | 0.0 | 3.2 | 1.3 | 2.2 | 0.0 | 0.0 |
| 43-48 | 2,4,6-trichlorophenol | | 45.3 | 53.7 | 54.4 | 57.5 | 4.0 | 0.0 |
| 49-54 | 2,3,4,5-tetrachlorophenol | | 0.0 | 4.3 | 3.8 | 5.3 | 0.0 | 4.5 |

TABLE I-continued

Percent Conversions of Cyclopentene to Polypentenamer with Different Phenolic Catalyst Modifiers

| Example Number | Phenol | Phenol/W[a] Al/W[b] | 1 | | 2 | | 3 | |
|---|---|---|---|---|---|---|---|---|
| | | | 2 | 3 | 3 | 4 | 3 | 4 |
| 55–60 | 2,3,5,6-tetrachlorophenol | | 15.6 | 53.9 | 71.8 | 66.0 | 73.4 | 73.3 |

[a]Molar ratio of phenol to tungsten. Ethanol was employed in all polymerizations at ethanol:$WCl_6$ = 1:1 molar ratio.
[b]Molar ratio of EADC:$WCl_6$.

The data in Table I illustrates rather markedly that the phenol used as a catalyst modifier must be substituted by a halogen in both positions adjacent to the —OH; that is, the 2 and 6 positions, if such a phenol is to have good activity as a catalyst modifier.

While certain representative embodiments and details have been shown for the purpose of illustrating the invention, it will be apparent to those skilled in this art that various changes and modifications may be made therein without departing from the spirit or scope of the invention.

What is claimed is:

1. A process for the preparation of cyclopentene polymers and copolymers comprising the polymerization of cyclopentene or mixtures of cyclopentene and at least one nonconjugated, unsaturated alicyclic compound containing at least seven carbon atoms in the ring and at least one double bond in the ring, by subjecting cyclopentene or its mixtures with said nonconjugated unsaturated alicyclic compound to polymerization conditions in the presence of a catalyst system comprising (A) a transition metal salt selected from the group consisting of tungsten halides and tungsten oxyhalides, (B) an organoaluminum compound, (C) at least one hydroxy compound of the general formula ROH wherein R is selected from the group consisting of alkyl, cycloalkyl, alkoxyalkyl, aralkyl and aryl, and (D) a halogenated phenol of the general formula:

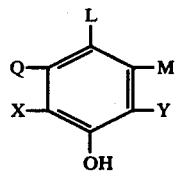

where X and Y are chlorine or bromine and Q, L and M are selected from the group consisting of H and R, and where R=—$C_nH_{2n+1}$ and n=1–4, and wherein at least one of Q, L and M is H or R, and wherein the molar ratio of A:B:C:D lies within the range of 1:0.5–10:0.5–3:0.1–3.

2. A process according to claim 1 carried out at a temperature between −50° C. to +100° C., wherein an aliphatic or cycloaliphatic hydrocarbon or a mixture thereof, is employed as the polymerization solvent, and wherein the molar ratio of tungsten salt:total monomer is at least about 1:20,000.